United States Patent [19]

Miller et al.

[11] Patent Number: 5,106,880
[45] Date of Patent: Apr. 21, 1992

[54] PLASTIC FOAM AGGREGATE MATRIX MADE FROM RECYCLED PAPER AND FIBER PRODUCTS

[76] Inventors: Jack V. Miller; Ruth E. Miller, both of 700 N. Auburn Ave., Sierra Madre, Calif. 91024

[21] Appl. No.: 606,736

[22] Filed: Oct. 30, 1990

[51] Int. Cl.$^5$ ............................ C08J 9/236; C08J 9/24
[52] U.S. Cl. ........................................ 521/54; 106/122; 521/40; 521/49; 521/84.1; 521/109.1; 521/155; 523/218
[58] Field of Search ................ 521/54, 84.1, 109.1, 521/155, 40, 49; 106/122; 523/218

[56] References Cited

U.S. PATENT DOCUMENTS

| | | | |
|---|---|---|---|
| 4,734,439 | 3/1988 | Reischl | 521/54 |
| 4,758,466 | 7/1988 | Dabi et al. | 521/54 |
| 4,801,621 | 1/1989 | Reischle | 521/54 |
| 4,843,105 | 6/1989 | Reischl et al. | 521/54 |

Primary Examiner—Morton Foelak

[57] ABSTRACT

A plastic foam material comprises an aggregate of discrete elements made of substantially individual cellulose fibers combined with a cellulose starch and including a plurality of bubbles produced by a gas-generating agent. The discrete elements are suspended in a matrix also including a plurality of bubbles produced by a gas-generating agent. In a preferred embodiment the matrix is also made of substantially individual cellulose fibers combined with a cellulose starch and formed into a geometric shape. In another preferred embodiment the discrete aggregate elements are substantially closed-cell foam and the matrix is substantially open-cell foam. In yet another preferred embodiment the discrete aggregate elements are substantially closed-cell, and the foam matrix is also substantially closed-cell.

5 Claims, 1 Drawing Sheet

U.S. Patent  Apr. 21, 1992  5,106,880
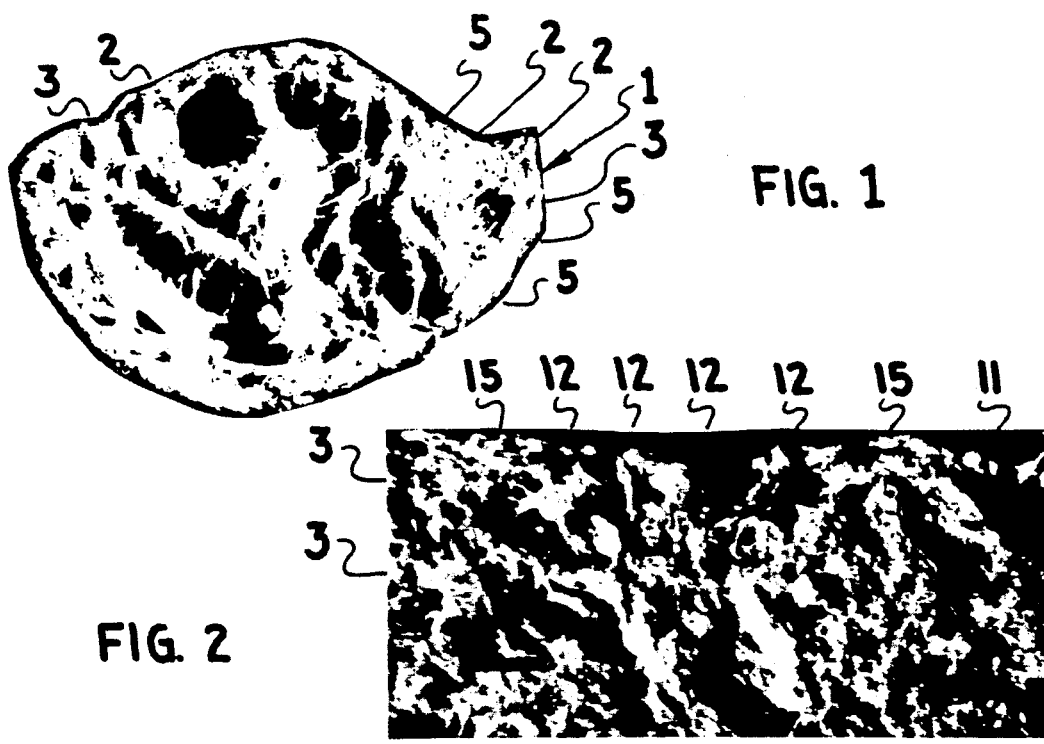
FIG. 1
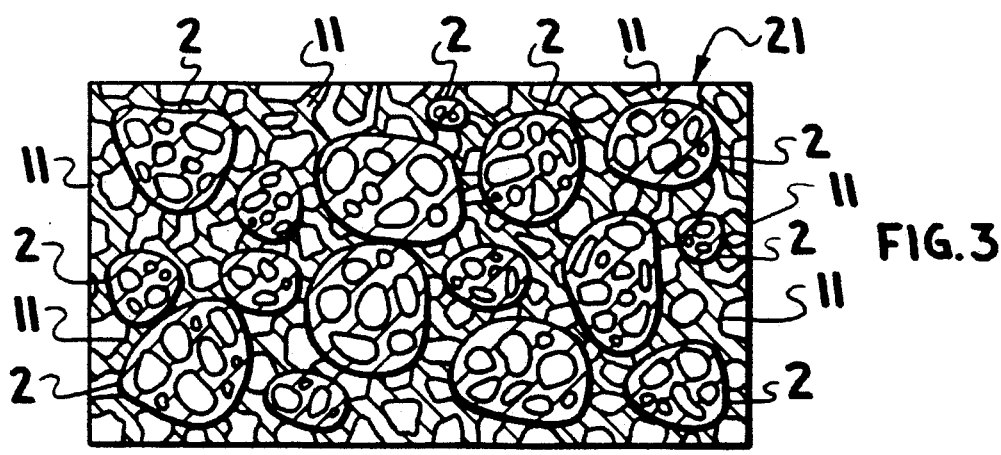
FIG. 2
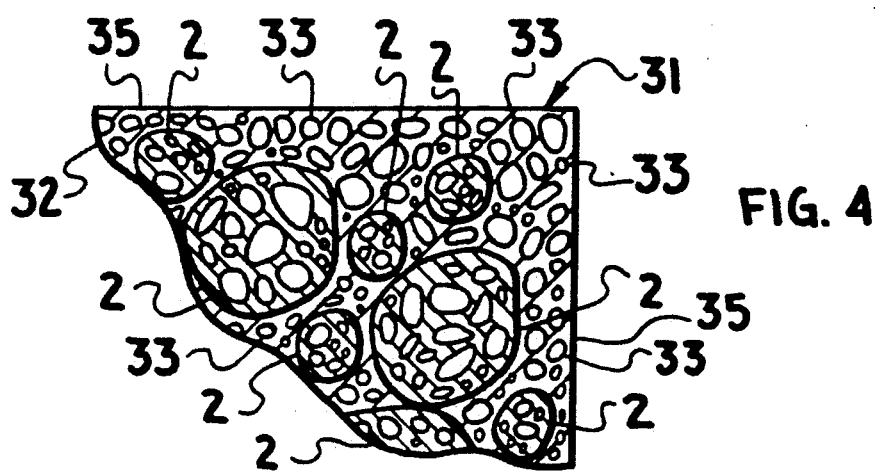
FIG. 3
FIG. 4

PLASTIC FOAM AGGREGATE MATRIX MADE FROM RECYCLED PAPER AND FIBER PRODUCTS

BACKGROUND OF THE INVENTION

This invention applies to plastic foam materials, and in particular to the materials used in manufacturing molded foam products having high insulation and cushioning capabilities, such as products for shipping boxes, including corrugated cardboard shipping containers used to store and ship fragile or perishable materials. Such foam insulation materials are widely used at present in the form of plastic foams that are made from petrochemicals. The principal disadvantages of such currently known manufacturing methods are that they require the use of petrochemical materials which are non-renewable resources and they employ environmentally-destructive chemicals as foam blowing agents. They also pose a substantial burden on solid waste disposal methods, are not bio-degradable and are not readily recyclable.

The present invention also relates to my co-pending patent application entitled: Process for Making Fiber Foam Packaging From Recycled Paper and Fiber Products, Ser. No. 562,833.

The basic purpose of the present invention is to provide foam plastic products for both impact and thermal insulation as well as structural purposes, made from materials which are renewable resources that are both recycled and recyclable.

SUMMARY OF THE INVENTION

The foregoing purposes of the invention are achieved by a plastic foam material in the form of a molded structure comprising an aggregate of discrete parts made of substantially individual cellulose fibers combined with a cellulose starch and including a plurality of closed-cell bubbles produced by a gas-generating agent and a matrix made of substantially individual cellulose fibers combined with a cellulose starch and including a plurality of open-cell spaces produced by a gas-generating agent, said matrix retaining the aggregate in a geometric shape. The geometric shape of the aggregate and matrix may include any form common to packing and shipping, including a parallelepiped, a truncated pyramid, a box including a lid, a cylindrical receptacle including a lid, a pair of hollow shells having mating surfaces which are joined together to form an enveloping enclosure or a corner pad having three contiguous orthogonal planar walls.

BRIEF DESCRIPTION OF THE DRAWINGS

FIG. 1 is a photographic cross-section of a closed-cell plastic foam aggregate part;

FIG. 2 is a photographic cross-section of an open-cell plastic foam matrix material;

FIG. 3 is a simplified cross-sectional drawing of a plastic foam structure having an open-cell matrix, according to the present invention; and FIG. 4 is a portion of a simplified cross-sectional drawing of a plastic foam structure having a closed-cell matrix, according to the present invention.

DETAILED DESCRIPTION OF THE DRAWINGS

In FIG. 1 the photographic cross section shows a substantially closed-cell plastic foam aggregate element 1 according to the present invention, having closed cells 2 comprised substantially of cellulose fibers 3 such as paper, textiles or virtually any plant fiber in a particulate consistency. It has been found that previously non-recyclable papers, such as slick magazines, are very well suited for this purpose as they contain sizing starches and clays that contribute to the desired properties of the fiber foam materials. produced by the process of the invention. A plurality of substantially closed-cell bubbles that create cells 2 are formed by the reaction of a gas-generating agent. The plastic foam part 1, according to the invention, is is the form of an aggregate element having a continuous outer skin 5 with the internal structure being substantially closed-cell foam. The aggregate elements 1 are usable by inclusion in a matrix to form a molded structure, much like rock aggregates are bonded together by cement to form concrete structures.

In FIG. 2 a plastic foam matrix 11 shows a substantially open-cell plastic foam part according to the present invention, having open cells 12, comprised substantially of cellulose fibers 2 such as paper, textiles or virtually any plant fiber in a particulate consistency. A plurality of substantially open-cells 12 are formed by the reaction of a gas-generating agent. The plastic foam matrix 11 is the form of a structure having a porous outer skin 15 with the internal structure being substantially open-cell foam.

In FIG. 3 a plastic foam part 21 according to the present invention is shown having an aggregate of closed-cell discrete parts 2 bonded together in an open-cell matrix 11.

In FIG. 4 a portion of a plastic foam part 31 according to the present invention is shown having an aggregate of closed-cell discrete parts 2 bonded together in a matrix 32 having closed cells 33, comprised substantially of cellulose fibers bonded together in a structure. A plurality of substantially closed-cells 33 are formed by the reaction of a gas-generating agent. The plastic foam part 31 has a continuous outer skin 35.

Experiments have shown that small aggregate elements that are from one quarter inch to one inch thick may be manufactured at relatively high speeds, as the water content used in their molding may be quickly removed from the small parts by heat. Then the aggregate may be included as the principal bulk of a larger part in which the aggregate is bonded together by a relatively small amount of matrix, which again may be quickly manufactured, as the relatively small water content used in the molding process is also rapidly removed by heat.

It has been found that the aggregate elements, once thoroughly dry, are only slightly softened, but not dissolved, by being mixed into the relatively wet matrix before forming and drying. Therefore the outer skins of the individual aggregate elements in contact with each other tend to mutually deform at their respective contact points, forming a structure that is comprised of greater than 80% closed-cell aggregate. The closed cells within the continuous skins of the individual aggregate elements, bonded together with either a closed-cell or an open-cell matrix, will produce a very strong, lightweight molded structure for various insulating, shock-absorbing or other structural functions.

Although the purpose of the invention is to utilize all recycled, recyclable and renewable materials, the aggregate also may be used as a light-weight and inexpensive insulating filler in prior-art plastic foams, such as foam-in-place polyurethane as the matrix.

The present invention overcomes the stated disadvantages of currently known foam packaging materials. The invention eliminates the use of petrochemicals, the environmentally-destructive chemicals as foam blowing agents, and the use of non bio-degradable, non recyclable materials. The basic purposes of our present invention are achieved by the preferred embodiments which provide easily-manufactured, low-cost plastic foam materials that are recycled, recyclable and made from renewable resources.

We claim:

1. A plastic foam material comprising:
   an aggregate of discrete parts made of substantially individual cellulose fibers combined with a cellulose starch and including a plurality of bubbles produced by a gas-generating agent; and
   a matrix enveloping said discrete parts, including a plurality of bubbles produced by a gas-generating agent, said matrix retaining the aggregate in a geometric shape.

2. A plastic foam material comprising:
   an aggregate of discrete parts made of substantially individual cellulose fibers combined with a cellulose starch and including a plurality of bubbles produced by a gas-generating agent; and
   a matrix made of of substantially individual cellulose fibers combined with a cellulose starch and including a plurality of bubbles produced by a gas-generating agent, said matrix retaining the aggregate in a geometric shape.

3. A plastic foam material according to claim 1 or 2 in which the bubbles in the discrete parts are substantially closed-cell.

4. A plastic foam material according to claim 1 or 2 in which the matrix is substantially open-cell.

5. A plastic foam material according to claim 1 or 2 in which the matrix is substantially closed-cell.

* * * * *